US011131580B2

(12) United States Patent
Cercone et al.

(10) Patent No.: US 11,131,580 B2
(45) Date of Patent: Sep. 28, 2021

(54) CUSTOMIZABLE SENSOR APERTURE WITH COMMON LENS

(71) Applicant: Gentex Corporation, Zeeland, MI (US)

(72) Inventors: Timothy J. Cercone, Allendale, MI (US); Danny L. Minikey, Jr., Fenwick, MI (US); Kenton J. Ypma, Hudsonville, MI (US); Kyle G. Jones, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 152 days.

(21) Appl. No.: 15/907,399

(22) Filed: Feb. 28, 2018

(65) Prior Publication Data

US 2018/0245973 A1   Aug. 30, 2018

Related U.S. Application Data

(60) Provisional application No. 62/465,020, filed on Feb. 28, 2017.

(51) Int. Cl.
| G01J 1/04 | (2006.01) |
| B60R 1/04 | (2006.01) |
| G01J 1/42 | (2006.01) |
| B60R 1/12 | (2006.01) |

(52) U.S. Cl.
CPC .............. *G01J 1/0403* (2013.01); *B60R 1/04* (2013.01); *G01J 1/4204* (2013.01); *B60R 2001/1223* (2013.01)

(58) Field of Classification Search
CPC ..................................................... G01J 1/0403
See application file for complete search history.

(56) References Cited

U.S. PATENT DOCUMENTS

| 4,701,022 A * | 10/1987 | Jacob ....................... G02B 5/08 359/603 |
| 6,347,872 B1 * | 2/2002 | Brechbill .................. B60R 1/06 359/838 |
| 2002/0024713 A1 * | 2/2002 | Roberts ................ H04B 1/3805 359/267 |
| 2004/0217266 A1 * | 11/2004 | Bechtel .............. G02B 19/0028 250/216 |
| 2016/0191863 A1 * | 6/2016 | Minikey, Jr. ......... H04N 5/2254 348/148 |

* cited by examiner

*Primary Examiner* — Georgia Y Epps
*Assistant Examiner* — Don J Williams
(74) *Attorney, Agent, or Firm* — Price Heneveld LLP; Bradley D. Johnson

(57) ABSTRACT

A sensor cover for a rearview assembly includes a body configured for secure engagement with the rearview assembly. At least one engagement feature extends rearward and is configured for removably coupling the body with a first housing having a first predefined configuration and a second housing having a second predefined configuration.

10 Claims, 15 Drawing Sheets

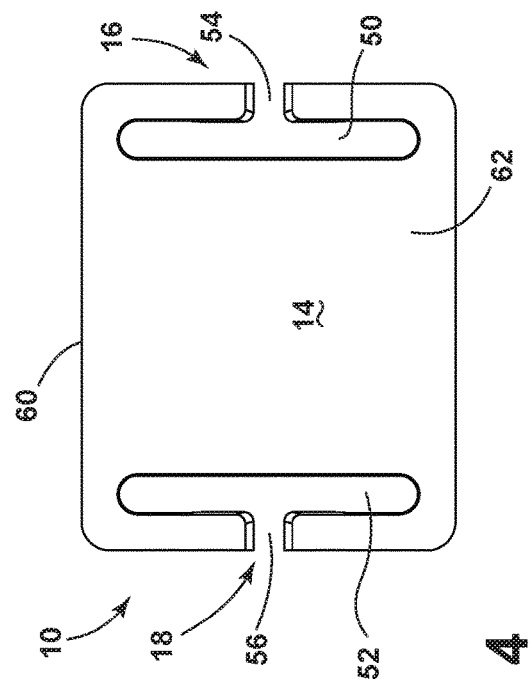
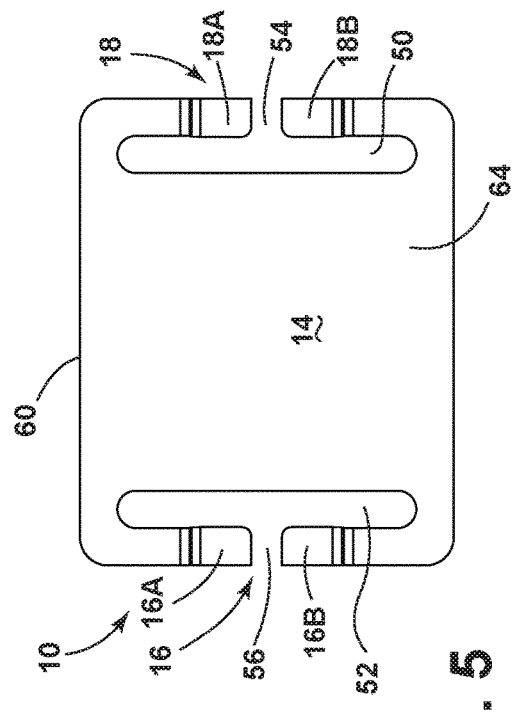
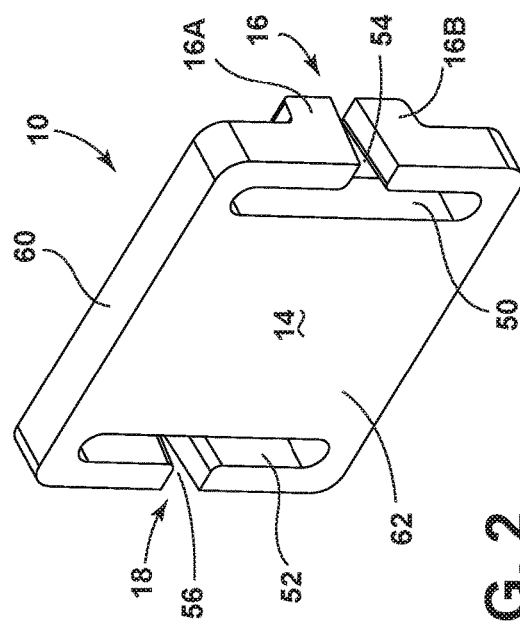
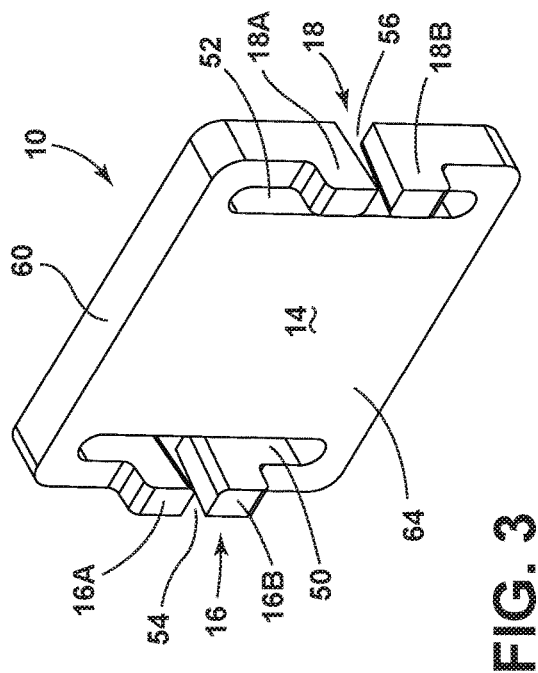
FIG. 2
FIG. 3
FIG. 4
FIG. 5

CUSTOMIZABLE SENSOR APERTURE WITH COMMON LENS

TECHNOLOGICAL FIELD

The present disclosure generally relates to a lens, and more particularly, to a customizable sensor aperture with a common lens.

SUMMARY OF THE DISCLOSURE

In one aspect of the present disclosure, a sensor cover for a rearview assembly comprises a body configured for secure engagement with the rearview assembly; and at least one engagement feature configured for removably coupling the body with a first housing having a first predefined configuration and a second housing having a second predefined configuration. The body mat be at least partially translucent or at least partially transparent. The engagement feature may extend rearward for engagement with the rearview assembly. The first housing may have a sensor opening extending through the housing; and the sensor cover may be configured to engage the first housing proximate the sensor opening. The second housing may have a sensor opening extending through the housing; and the sensor cover may be configured to engage the second housing proximate the sensor opening. A front side of the sensor cover may be generally planar and a back side of the sensor cover may include the at least one engagement feature. The at least one engagement features may hold the sensor cover against an inside wall of the housing; and a front side of the sensor cover may abut the inside wall of the housing. A light sensor may be disposed within the housing; and the light sensor may be in optical communication with the sensor cover. The sensor cover may be configured to cover a light aperture in the housing. A light sensor may be disposed within the housing and in optical communication with the light aperture in the housing.

According to another aspect of the disclosure, a sensor cover may comprise an at least partially translucent body and at least one engagement feature extending from the body and configured for coupling with a first housing and a second housing. The second housing may have a different configuration from the first housing.

These and other features, advantages, and objects of the present disclosure will be further understood and appreciated by those skilled in the art by reference to the following specification, claims, and appended drawings.

BRIEF DESCRIPTION OF THE DRAWINGS

In the drawings:

FIG. 2 is a front perspective view of a sensor cover of the present disclosure;

FIG. 3 is a rear perspective view of the sensor cover of FIG. 2;

FIG. 4 is a front elevational view of the sensor cover of FIG. 2;

FIG. 5 is a rear elevational view of the sensor cover of FIG. 2;

DETAILED DESCRIPTION

Figure 1A:
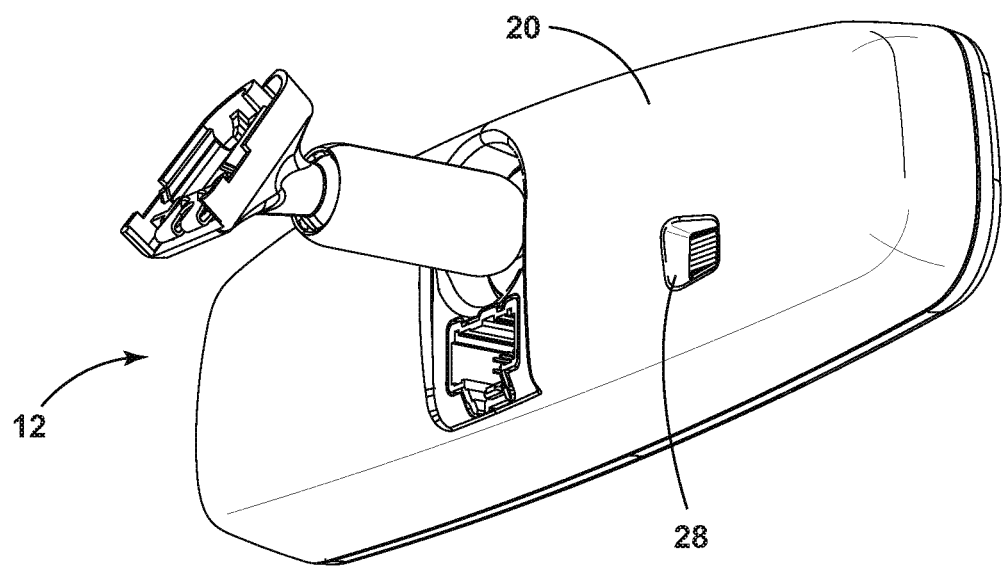
FIG. 1A is a top rear perspective view of a rearview assembly of the present disclosure.

The present illustrated embodiments reside primarily in combinations of method steps and apparatus components related to a sensor cover for a rearview assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1A-39, reference numeral 10 generally designates a sensor cover for a rearview assembly 12, 13 that includes an at least partially translucent body 14 configured for secure engagement with the rearview assembly 12. First and second engagement features 16, 18 extend rearward and are configured for removably coupling the body 14 with a first rearview device housing 20 having a first predefined configuration and a second rearview device housing 22 having a second predefined configuration. The second predefined configuration of the second rearview device housing 22 may be different from the first predefined configuration of the first rearview device housing 20.

Figure 1B:
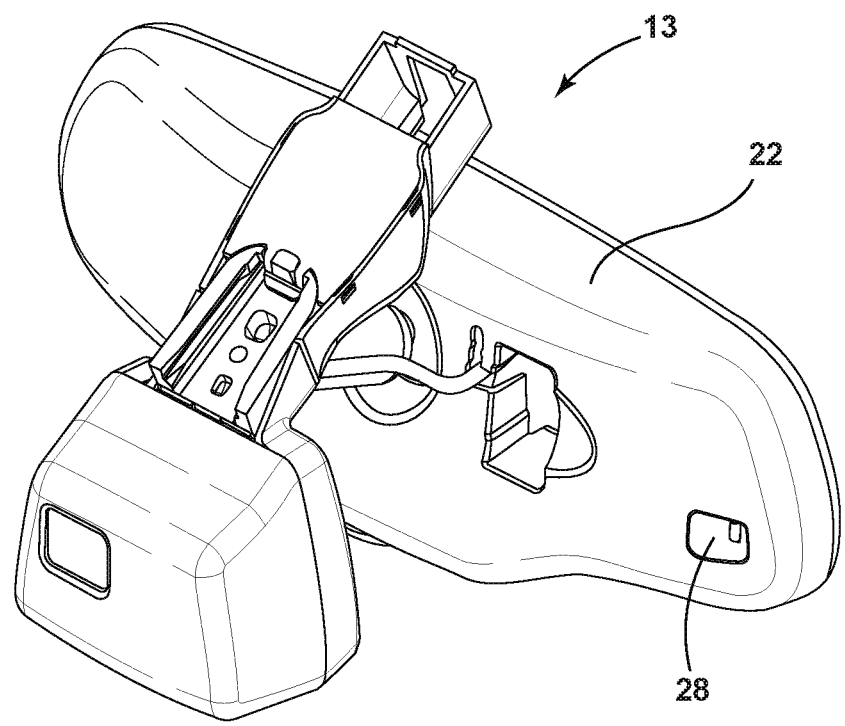
FIG. 1B is a top rear perspective view of a rearview assembly of the present disclosure.
Figure 6:
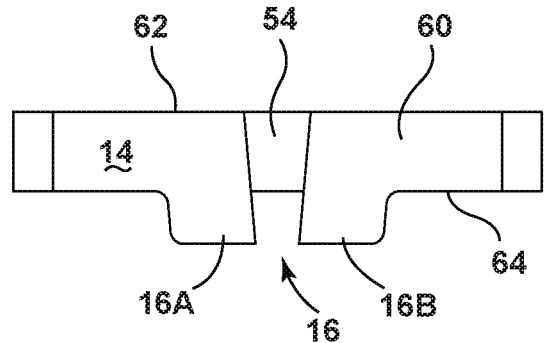
FIG. 6 is a first side elevational view of the sensor cover of FIG. 2.
Figure 7:
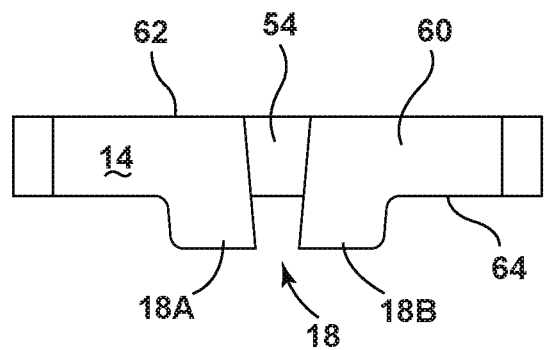
FIG. 7 is a second side elevational view of the sensor cover of FIG. 2.
Figure 8:
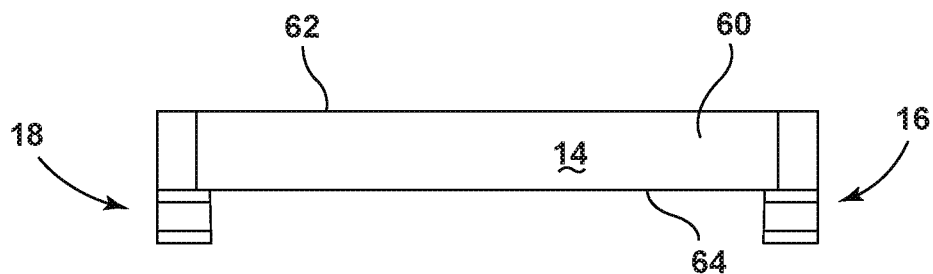
FIG. 8 is a top plan view of the sensor cover of FIG. 2.
Figure 9:
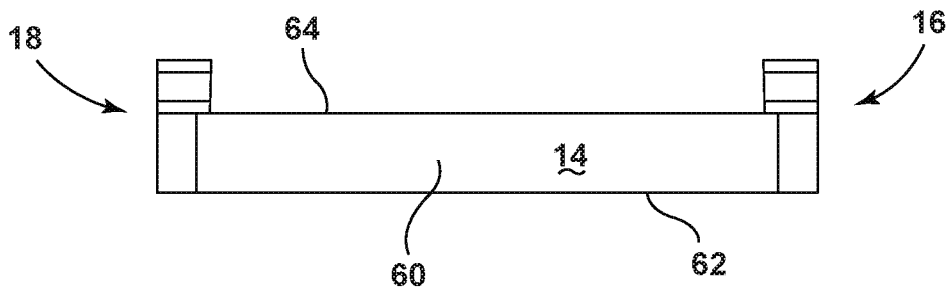
FIG. 9 is a bottom plan view of the sensor cover of FIG. 2.

With reference again to FIGS. 1A and 1B, the illustrated sensor cover 10 is generally configured for secure engagement with either of rearview assemblies 12, 13 proximate a sensor opening 28. For purposes of brevity, the connection of sensor cover 10 with the rearview assembly 12 will be discussed. However, it will be understood that the rearview assembly 13 will have similar features and components as the rearview assembly 12 configured to accommodate the sensor cover 10. The sensor cover 10 is configured to securely engage an inside wall 30 of the housing 20 of the rearview assembly 12. The at least partially translucent body 14 of the sensor cover 10 is configured to allow light to pass therethrough so that a light sensor, which may be an ambient light sensor, disposed within the housing 20 can detect ambient light levels. The sensor cover 10 is designed for use in a multitude of different rearview assemblies 12. Two exemplary rearview assemblies 12 are illustrated in FIGS. 1A and 1B. However, it will be understood that the sensor cover 10 may be applied to virtually any rearview assembly housing 20. Accordingly, the sensor cover 10 could be removed from the first rearview device housing 20 and coupled with the second rearview device housing 22. This versatility in coupling a lens or sensor cover 10 to housings of different shapes and sizes results in lower manufacturing costs, easy replacement of damaged or outdated sensor covers, and an improved design that can be applied across many housing platforms.

With reference now to FIGS. 2-11, the illustrated sensor cover 10 is configured to engage the inside wall 30 of the housing 20 proximate the sensor opening 28 through the housing 20. The inside wall 30 of the housing 20 includes first and second protuberances 42, 44 that extend inwardly into the housing 20. The first and second protuberances 42, 44 are complementary to and configured to engage with the first and second engagement features 16, 18 of the sensor cover 10. In the illustration of FIG. 3, the first and second protuberances 42, 44 include inwardly-directed hooks 45 that retain the first and second engagement features 16, 18. It will be generally understood that the sensor cover 10 may slide into frictional connection with the first and second protuberances 42, 44 on the inside wall 30 of the housing 20 or may be a snap fit, an interference fit, etc.

With reference to FIGS. 4-11, the translucent body 14 of the sensor cover 10 includes first and second side slots 50, 52, which extend through the translucent body 14. First and second side channels 54, 56 extend from the first and second side slots 50, 52 to a periphery 60 of the translucent body 14. A front side 62 of the sensor cover 10 is generally planar, while a back side 64 of the sensor cover 10 includes the first and second engagement features 16, 18, which extend orthogonally from a planar extent of the translucent body 14. The first engagement feature 16 includes upper and lower connectors 16A, 16B configured to engage the first protuberance 42 extending from the inside wall 30 of the housing 20. Likewise, the second engagement feature 18 includes upper and lower connectors 18A, 18B configured to engage the second protuberance 44 extending from the inside wall 30 of the housing 20. It will be understood that the upper and lower connectors 16A, 16B, 18A, and 18B can flex to accommodate the size and rigidity of the first and second protuberances 42, 44 extending inwardly from the housing 20.

Figure 10:
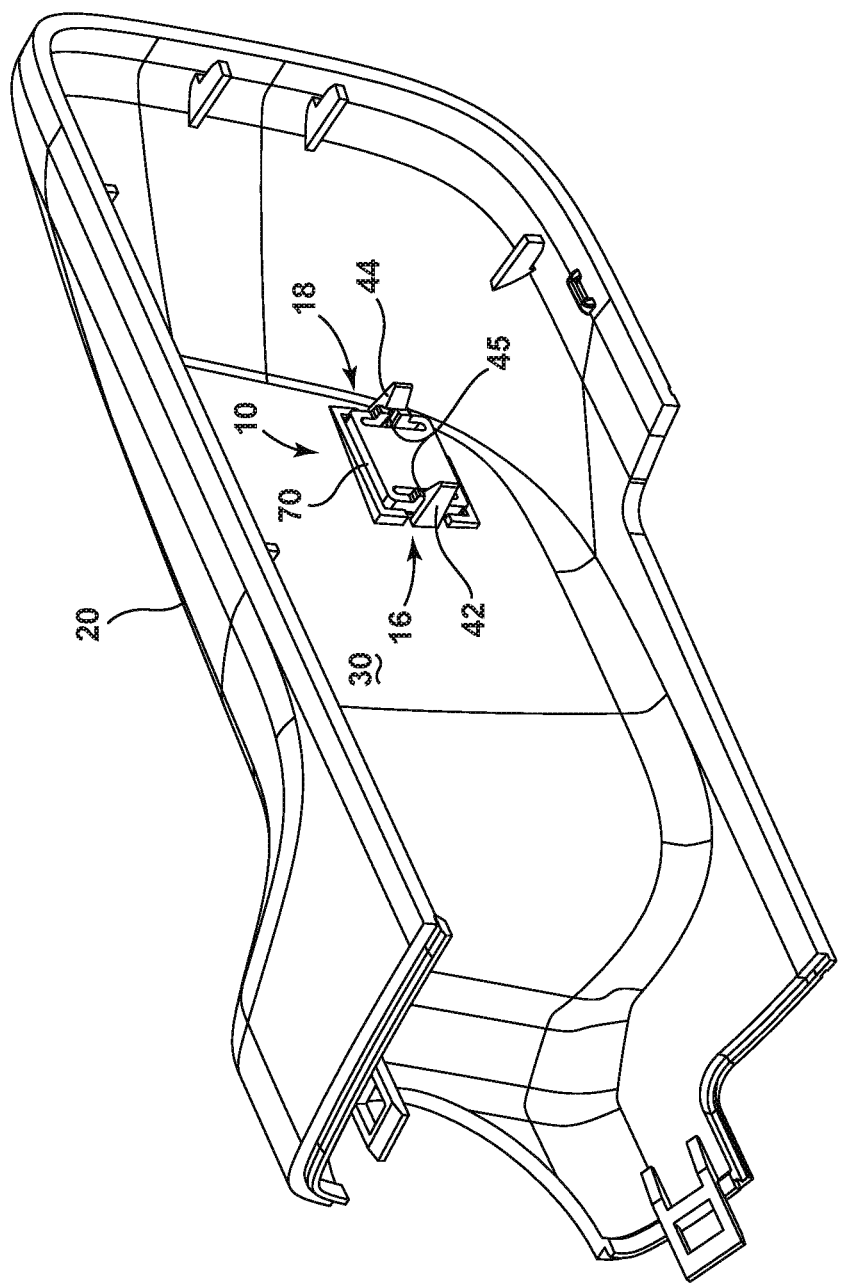
FIG. 10 is a top perspective view of an internal portion of a rearview assembly housing including the sensor cover of FIGS. 2-9.
Figure 11:
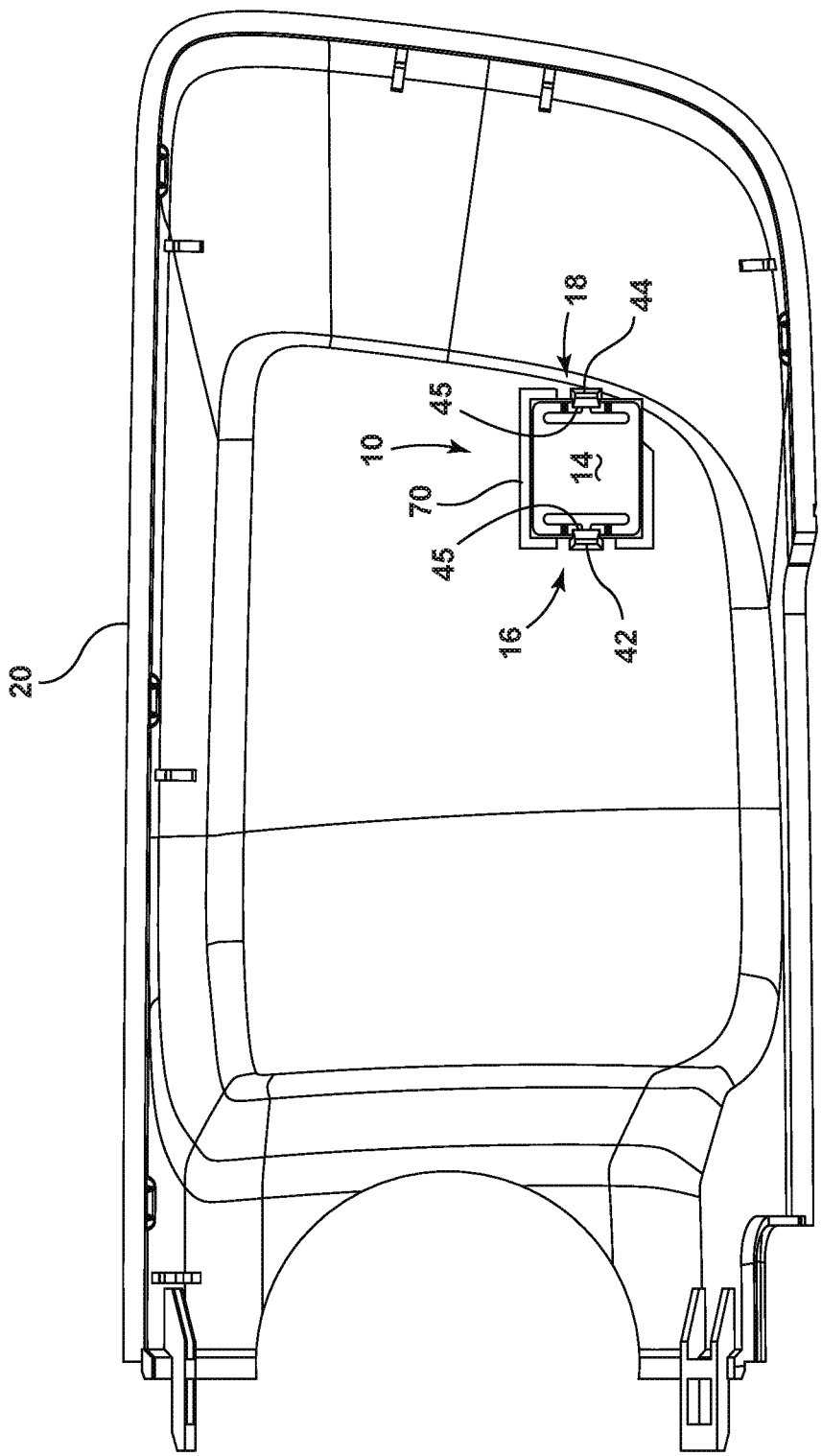
FIG. 11 is a front elevational view of the internal portion of the rearview assembly of FIG. 10.
Figure 12:
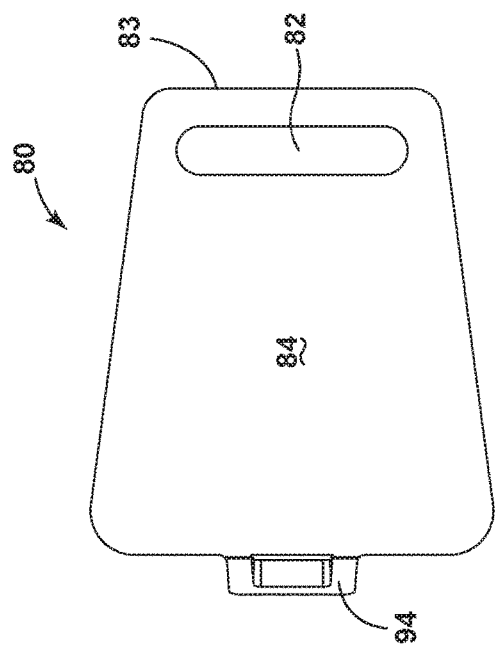
FIG. 12 is a front perspective view of another sensor cover of the present disclosure.
Figure 14:
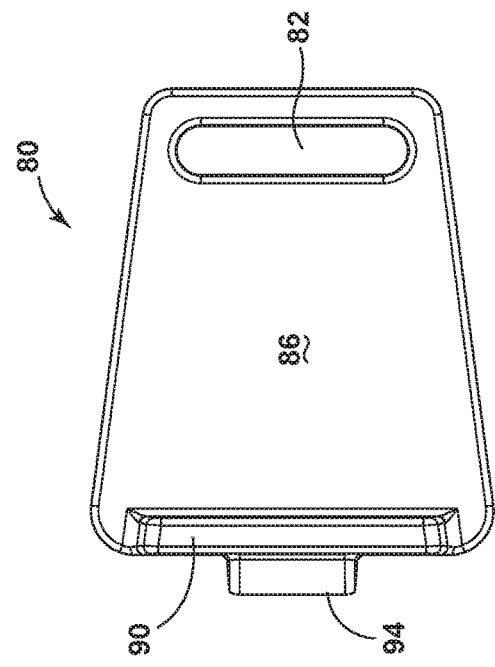
FIG. 14 is a front elevational view of the sensor cover of FIG. 12.
Figure 13:
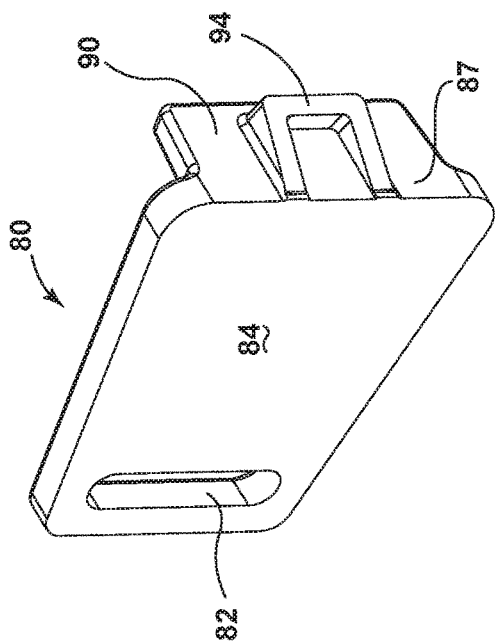
FIG. 13 is a rear perspective view of the sensor cover of FIG. 12.
Figure 15:
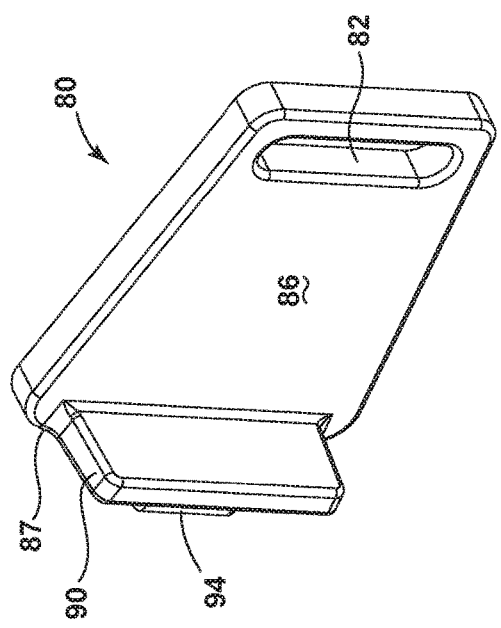
FIG. 15 is a rear elevational view of the sensor cover of FIG. 12.
Figure 16:
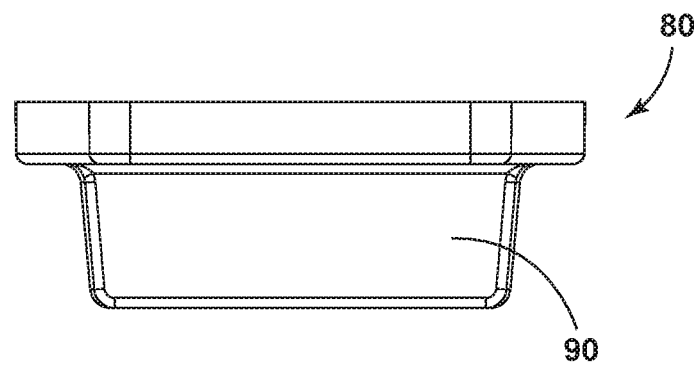
FIG. 16 is a first side elevational view of the sensor cover of FIG. 12.
Figure 17:
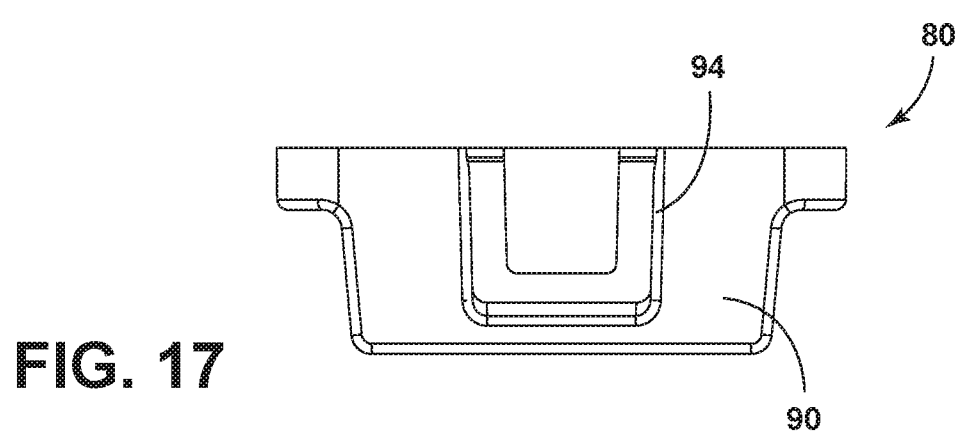
FIG. 17 is a second side elevational view of the sensor cover of FIG. 12.
Figure 18:
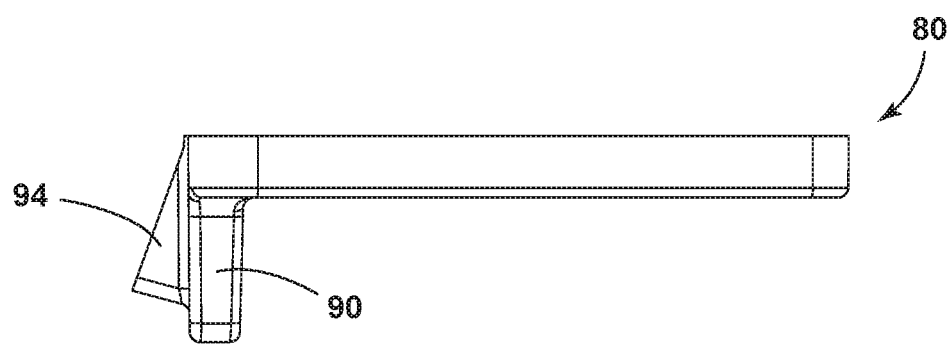
FIG. 18 is a top plan view of the sensor cover of the FIG. 12.
Figure 19:
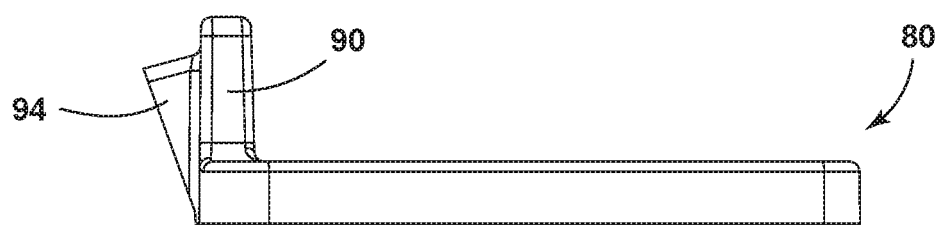
FIG. 19 is a bottom plan view of the sensor cover of FIG. 12.

With reference now to FIGS. 10 and 11, to install the sensor cover 10 within the housing 20, the sensor cover 10 may simply be slipped into secure engagement with the housing 20, aligning the first and second engagement features 16, 18 with the first and second protuberances 42, 44 of the housing 20. Once aligned, the sensor cover 10 is pushed into secure engagement with the inside wall 30 until the front side 62 of the sensor cover 10 is in secure engagement with a peripheral inner rim 70 of the housing 20. Upon contact with the peripheral inner rim 70, the first and second protuberances 42, 44 should be positively engaged with the first and second engagement features 16, 18.

Figure 20:
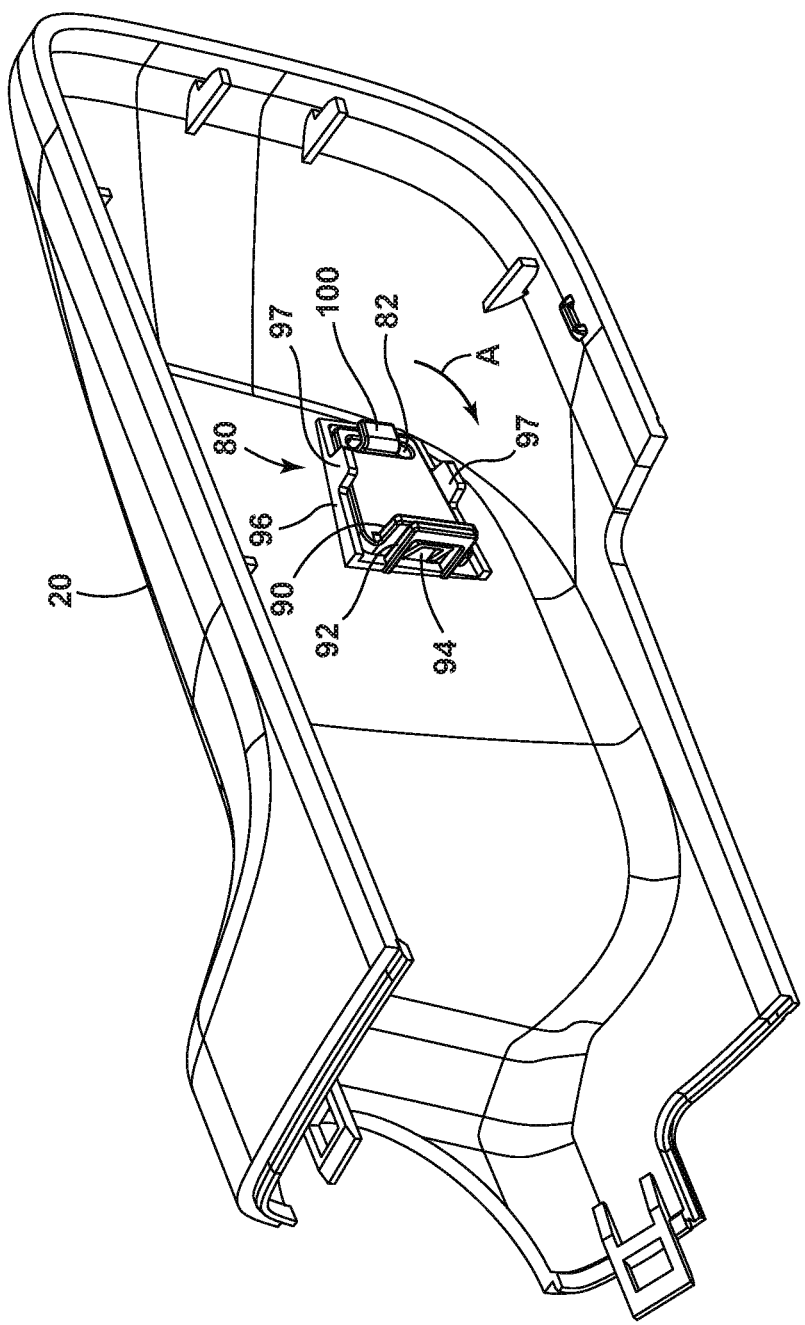
FIG. 20 is a top perspective view of an internal portion of a housing of another rearview assembly of the present disclosure including the sensor cover of FIGS. 12-19.
Figure 21:
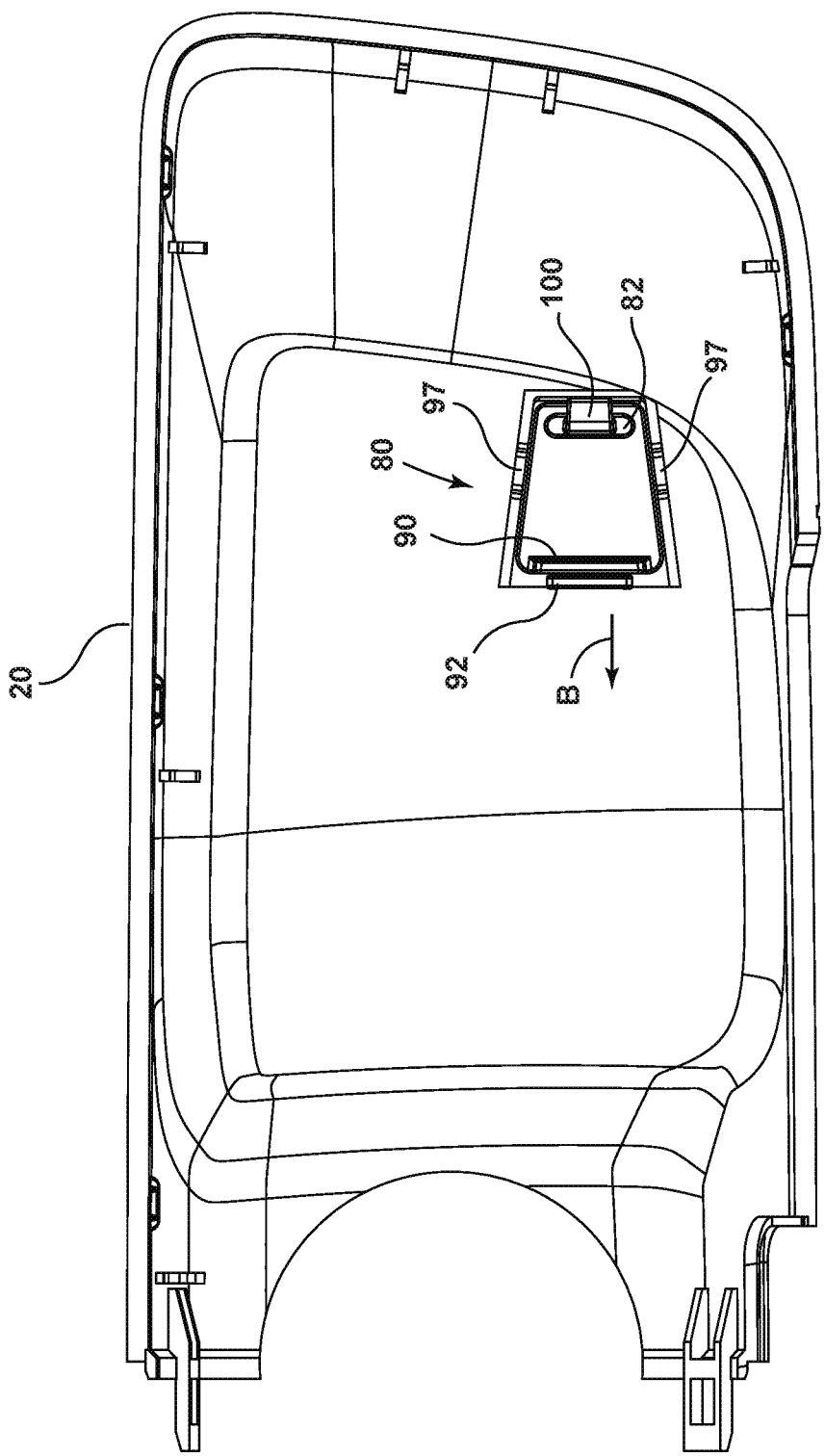
FIG. 21 is a front elevational view of the rearview assembly of FIG. 12.
Figure 22:
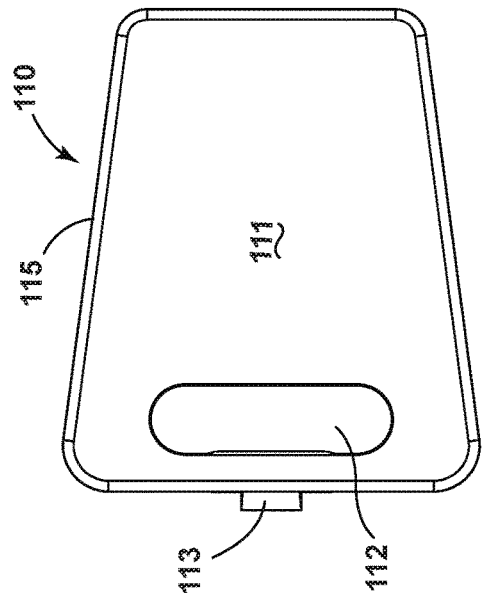
FIG. 22 is a front perspective view of another sensor cover of the present disclosure.
Figure 24:
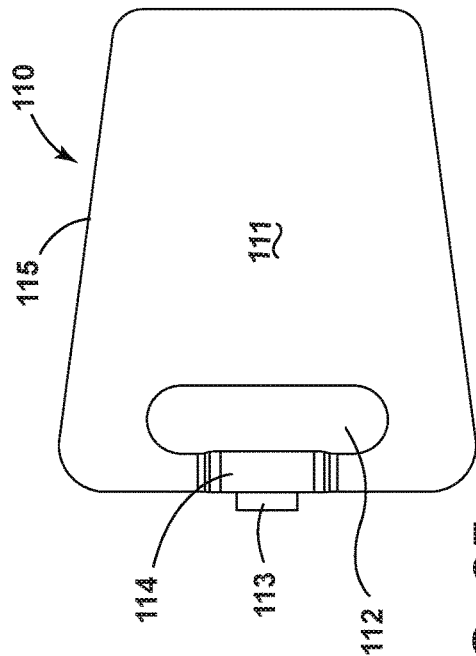
FIG. 24 is a front elevational view of the sensor cover of FIG. 22.
Figure 23:
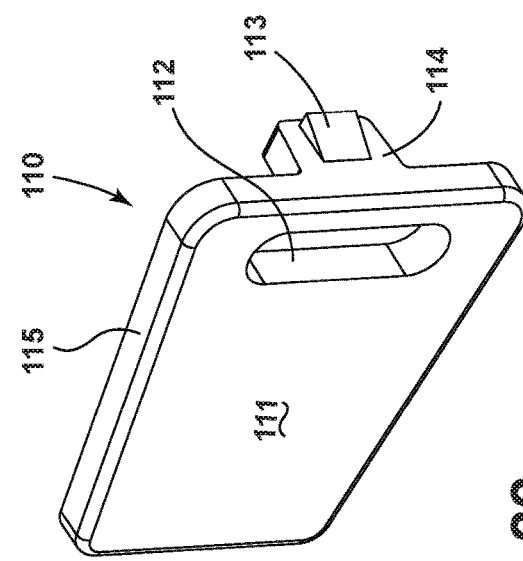
FIG. 23 is a rear perspective view of the sensor cover of FIG. 22.
Figure 25:
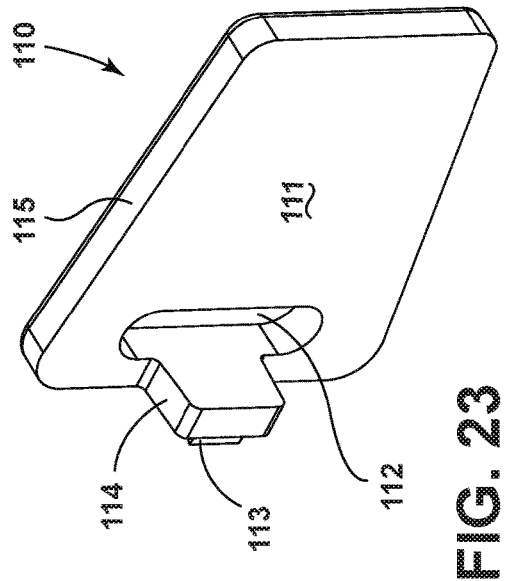
FIG. 25 is a rear elevational view of the sensor cover of FIG. 22.
Figure 26:
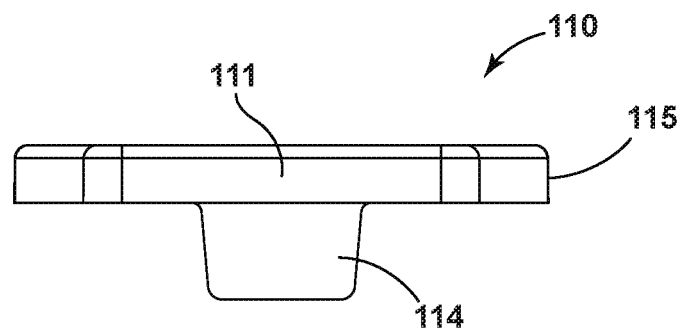
FIG. 26 is a first side elevational view of the sensor cover of FIG. 22.
Figure 27:
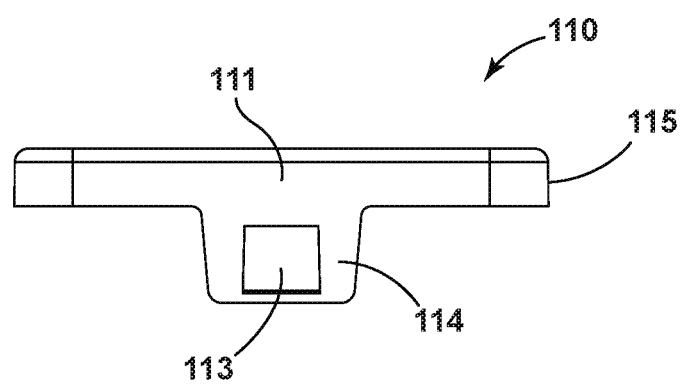
FIG. 27 is a second side elevational view of the sensor cover of FIG. 22.
Figure 28:
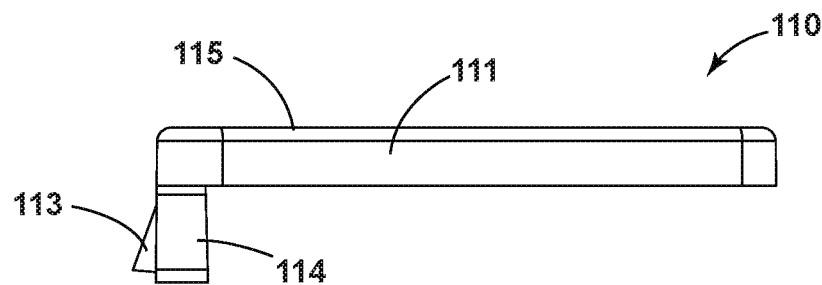
FIG. 28 is a top plan view of the sensor cover of FIG. 22.
Figure 29:
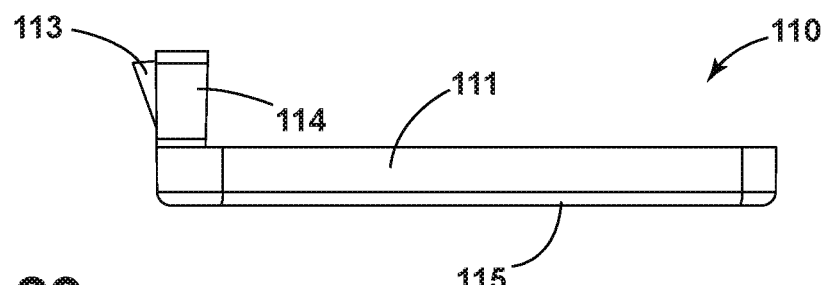
FIG. 29 is a bottom plan view of the sensor cover of FIG. 22.
Figure 30:
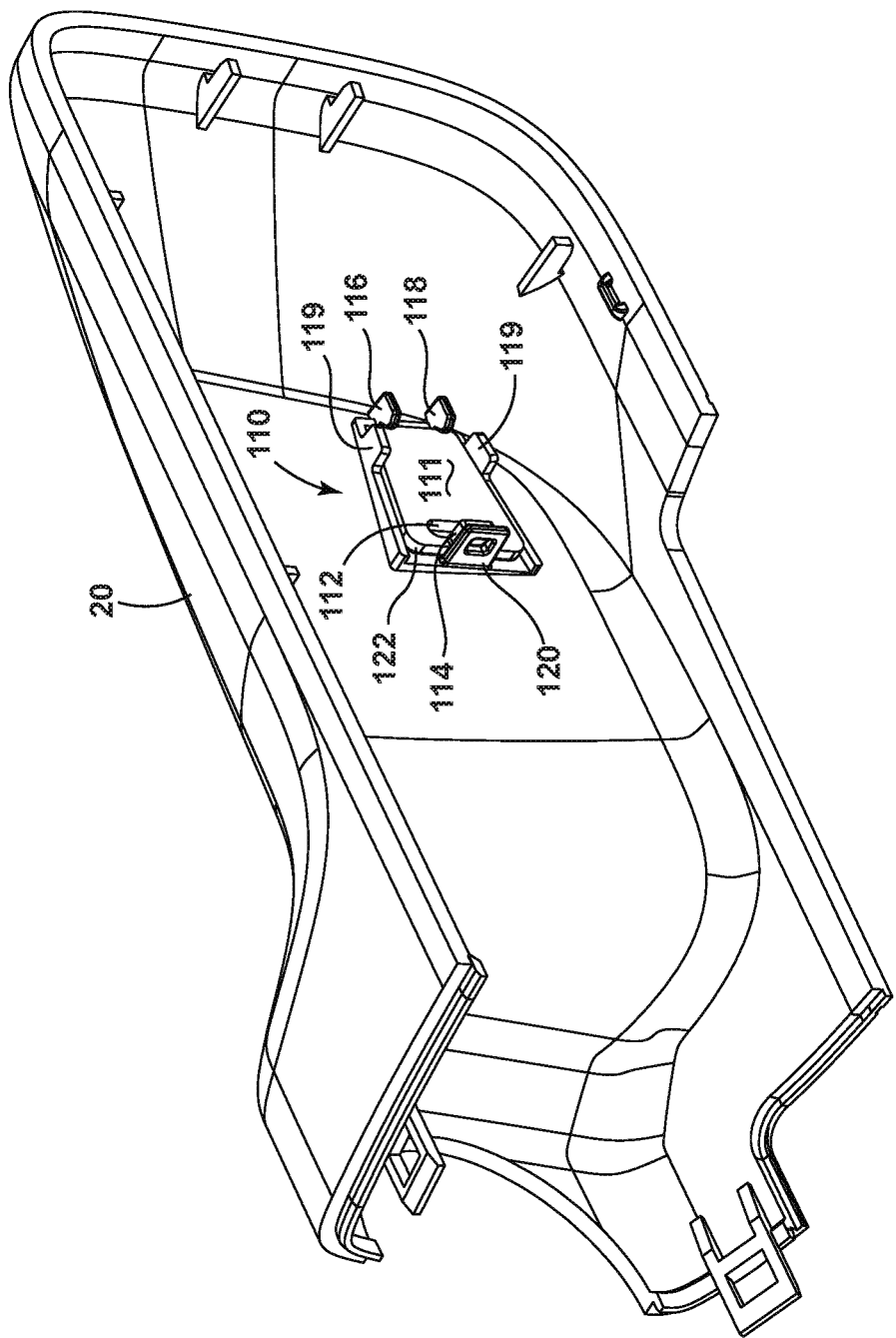
FIG. 30 is a top perspective view of an internal portion of a housing of another rearview assembly of the present disclosure including the sensor cover of FIGS. 22-29.
Figure 31:
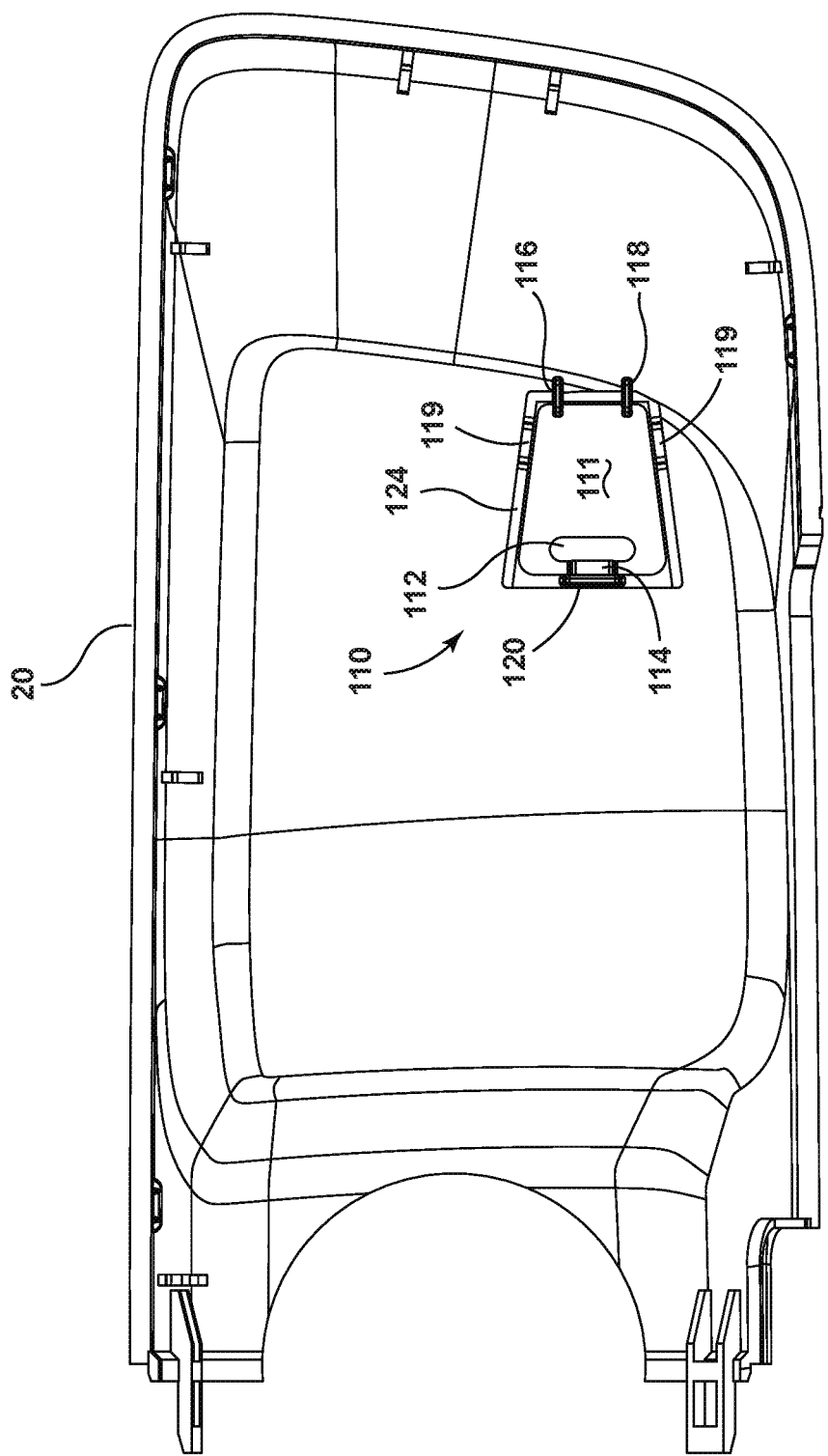
FIG. 31 is a front elevational view of the rearview assembly of FIG. 22.
Figure 34:
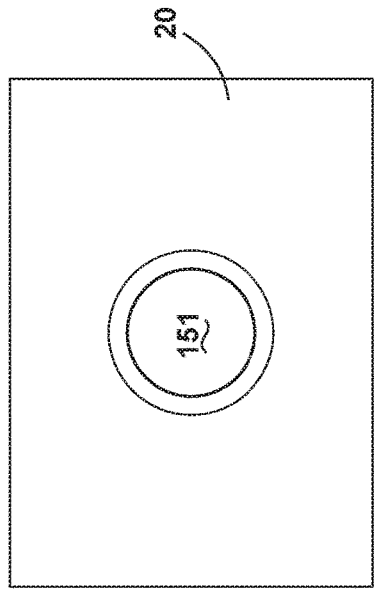
FIG. 34 is a front elevational view of the sensor cover of FIG. 32.
Figure 35:
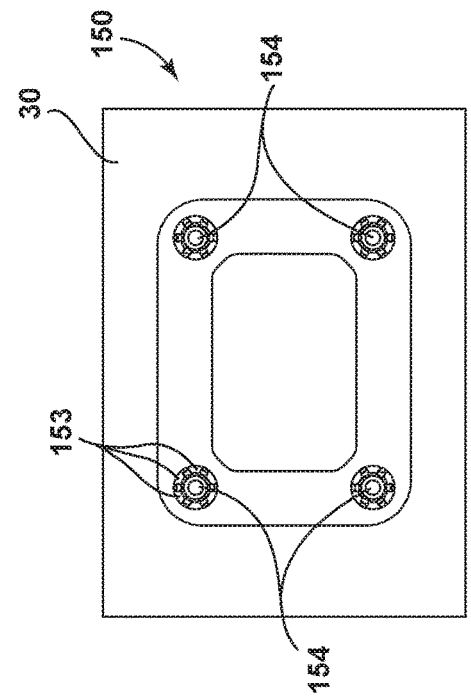
FIG. 35 is a rear elevational view of the sensor cover of FIG. 32.
Figure 32:
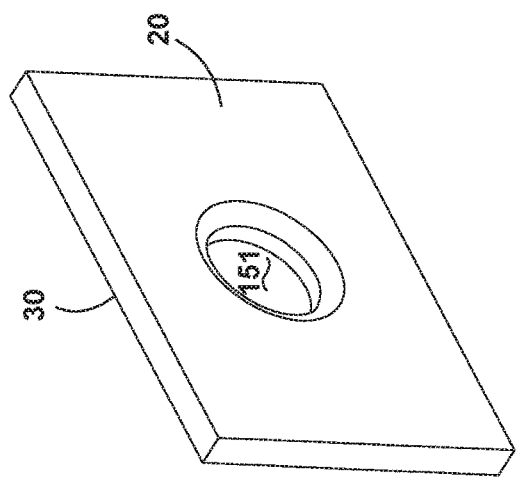
FIG. 32 is a front perspective view of another sensor cover for a rearview assembly of the present disclosure.
Figure 33:
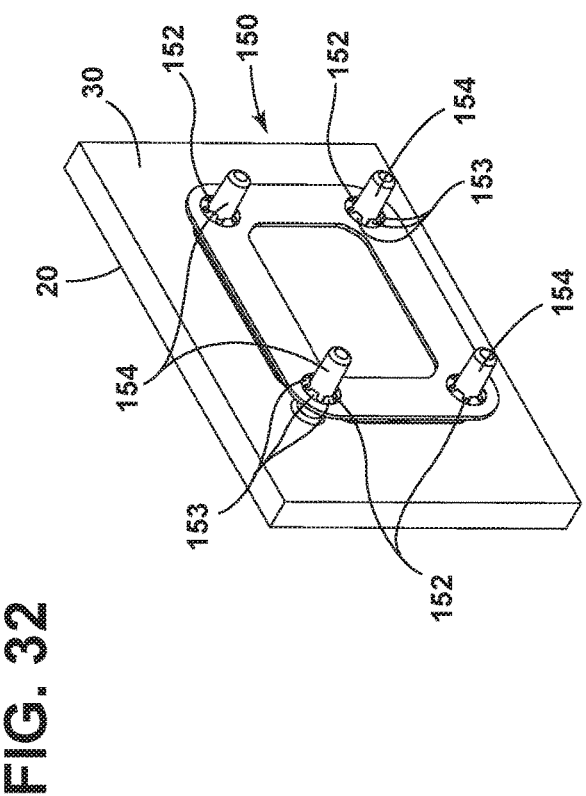
FIG. 33 is a rear perspective view of the sensor cover of FIG. 32.
Figure 36:
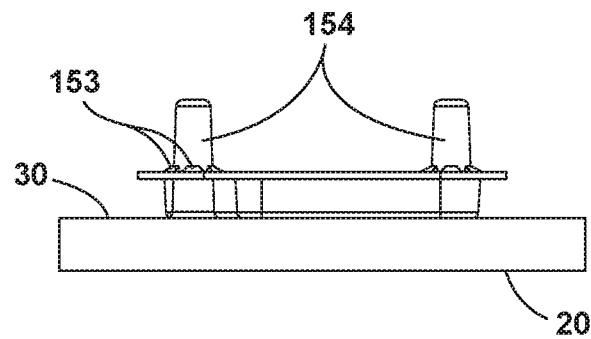
FIG. 36 is a first side elevational view of the sensor cover of FIG. 32.
Figure 37:
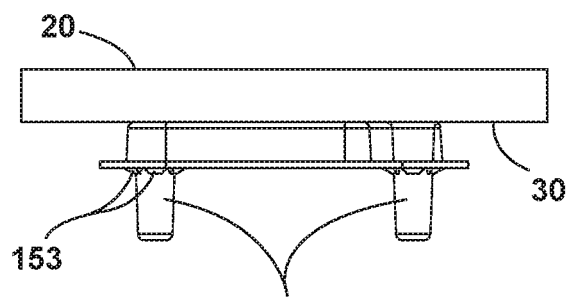
FIG. 37 is a second side elevational view of the sensor cover of FIG. 32.
Figure 38:
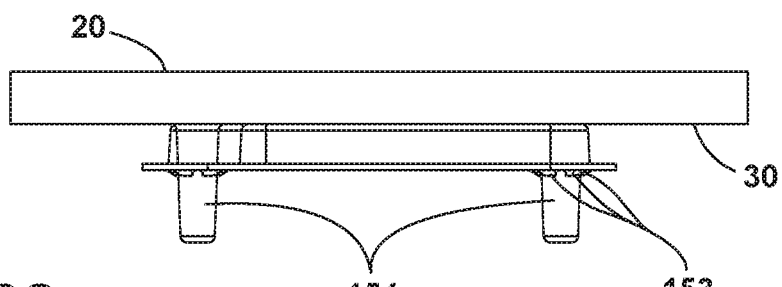
FIG. 38 is a top plan view of the sensor cover of FIG. 32.
Figure 39:
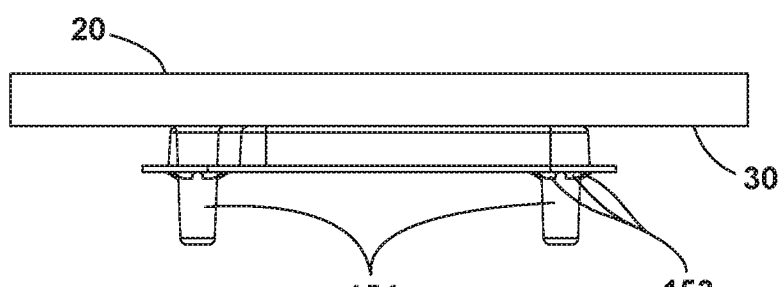
FIG. 39 is a bottom plan view of the sensor cover of FIG. 32.

With reference now to FIGS. 12-19, a sensor cover 80 is illustrated that includes a configuration that allows for rotation into secure engagement with the inside wall 30 of the housing 20. As shown in FIGS. 14-21, the sensor cover 80 includes a slot 82 disposed on a first end 83 of the sensor cover 80 that extends through the sensor cover 80 from a front side 84 to a rear side 86 of the sensor cover 80. A second end 87 of the sensor cover 80 includes an engagement feature 90 configured for snap engagement with a latching feature 92 extending within the housing 20 (FIGS. 20 and 21). The engagement feature 90 includes an outwardly-extending lip 94 configured to securely engage the latching feature 92.

With reference now to FIGS. 20 and 21, during assembly, a hook 100 extends inwardly from the inside wall 30 of the housing 20 and engages the slot 82 of the sensor cover 80. The sensor cover 80 is then rotated laterally and inwardly in the direction of arrow A (FIG. 20) until the engagement feature 90 abuts a rim 96 and securely engages the latching feature 92 on the inside wall 30 of the housing 20. Guides 97 may help locate the sensor cover 80 against the rim 96 to create a good fit. Once engaged, the sensor cover 80 will protect a light sensor disposed behind the sensor cover 80 within the housing 20. To remove the sensor cover 80, the latching feature 92 is pushed away from the sensor cover 80 in the direction of arrow B (FIG. 21) until the sensor cover 80 can be rotated in a direction opposite of arrow A (FIG. 20) and the slot 82 is withdrawn from the hook 100. The sensor cover 80 can then be positioned within a different housing 20 in secure engagement with the housing 20 to provide sufficient light into the housing 20 to allow an ambient light sensor to function properly.

With reference now to FIGS. 22-31, a sensor cover 110 is illustrated that includes a clear body 111 and a slot 112 proximate an engagement feature 114 of the sensor cover 110. A lip 113 of the engagement feature 114 extends away from the slot 112. A periphery 115 of the sensor cover 110 includes a trapezoidal-like shape. The sensor cover 110 can be slid into connection with first and second overhangs 116, 118 (FIGS. 30 and 31) protruding from the inside wall 30 of a housing 20. An interlocking feature 120 also extends inwardly from the inside wall 30 of the housing 20, such that the first and second overhangs 116, 118 hold the sensor cover 110 against the inside wall 30 of the housing 20. Guides 119 help align the sensor cover 110 with an aperture 122 With reference now to FIGS. 30 and 31, during assembly, the sensor cover 110 is slid into secure engagement with the first and second overhangs 116, 118, the engagement feature 114 can be forced inward towards the inside wall 30 of the housing 20 until the interlocking feature 120, extending inwardly within the housing 20, securely engages the engagement feature 114 and the body 111 engages a rim 124 on the inside wall 30 of the housing 20.

With reference now to FIGS. 32-39, a sensor cover 150 is illustrated that is configured to cover a light aperture 151. The sensor cover 150 includes a plurality of holes 152 defining friction fingers 153 that are configured to engage inwardly-extending stakes 154 that protrude from the inside wall 30 of the housing 20. The sensor cover 150 can then be forced into secure engagement with the stakes 154 until a front side of the sensor cover 150 abuts the inside wall 30 of the housing 20. The sensor cover 150 is configured to protect a light sensor disposed within the housing 20 behind the light aperture 151, yet allow sufficient light to extend to the light sensor so that ambient light sensor readings can be received.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A sensor cover for a rearview assembly, the sensor cover comprising:
    a body configured for secure engagement with the rearview assembly; and
    a first engagement feature and a second engagement feature, the first and the second engagement features configured for removably coupling the body with a first housing having a first predefined configuration and a second housing having a second predefined configuration;
    wherein the first housing defines a first sensor opening extending through the housing;
    wherein the first and the second engagement features of the sensor cover are configured to engage the first housing proximate the first sensor opening;

wherein the body of the sensor cover is configured to protect a sensor disposed behind the sensor cover within the first housing;

wherein the second housing defines a second sensor opening extending through the housing;

wherein the first and the second engagement features of the sensor cover are configured to engage the second housing proximate the second sensor opening;

wherein each of first and second housings comprises a first and a second protuberance extending from an inside wall of the housing;

wherein each of the first and second engagement features comprises at least one connector configured to engage first and second protuberances; and wherein the body of the sensor cover is configured to protect a sensor disposed behind the sensor cover within the second housing.

2. The sensor cover of claim 1, wherein the body is at least partially translucent.

3. The sensor cover of claim 1, wherein the body is at least partially transparent.

4. The sensor cover of claim 1, wherein the first and second engagement features extend rearward for engagement with the rearview assembly.

5. The sensor cover of claim 1, wherein a front side of the sensor cover is generally planar and a back side of the sensor cover includes the first and second engagement features.

6. The sensor cover of claim 1, wherein the first and second engagement features hold the sensor cover against an inside wall of the housing; and wherein a front side of the sensor cover abuts the inside wall of the housing.

7. The sensor cover of claim 1, wherein a light sensor is disposed within the housing; and wherein the light sensor is in optical communication with the sensor cover.

8. The sensor cover of claim 1, wherein the sensor cover is configured to cover a light aperture in the housing.

9. The sensor cover of claim 8, wherein a light sensor is disposed within the housing and in optical communication with the light aperture in the housing.

10. A sensor cover comprising:

an at least partially translucent body; and a first engagement feature and a second engagement feature, the first and second engagement features extending from a first side of the body, the engagement features configured for coupling with a first housing of a first rearview assembly and with a second housing of a second rearview assembly;

wherein each of first and second housings comprises a first and a second protuberance extending from an inside wall of the housing;

wherein each of the first and second engagement features comprises at least one connector configured to engage first and second protuberances; and wherein the second housing has a different configuration from the first housing.

* * * * *